US012596988B1

(12) United States Patent
Sides

(10) Patent No.: US 12,596,988 B1
(45) Date of Patent: *Apr. 7, 2026

(54) REPOSITORY FOR SECURE PACKAGE DROP-OFF AND PICK-UP

(71) Applicant: Loxx Boxx Inc., Lewisville, NC (US)

(72) Inventor: Rodney Ray Sides, Lewisville, NC (US)

(73) Assignee: Loxx Boxx Inc., Lewisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,106

(22) Filed: Oct. 10, 2024

Related U.S. Application Data

(63) Continuation of application No. 17/388,722, filed on Jul. 29, 2021, now Pat. No. 12,118,504, which is a continuation of application No. 16/703,994, filed on Dec. 5, 2019, now abandoned.

(60) Provisional application No. 62/781,931, filed on Dec. 19, 2018.

(51) Int. Cl.
| | |
|---|---|
| *G06Q 10/08* | (2024.01) |
| *G06K 7/14* | (2006.01) |
| *G06Q 10/0833* | (2023.01) |
| *G06Q 10/0836* | (2023.01) |
| *G06Q 10/0837* | (2023.01) |
| *G06Q 10/107* | (2023.01) |
| *G07C 9/00* | (2020.01) |

(52) U.S. Cl.
CPC .......... *G06Q 10/0836* (2013.01); *G06K 7/14* (2013.01); *G06Q 10/0833* (2013.01); *G06Q 10/0837* (2013.01); *G06Q 10/107* (2013.01); *G07C 9/00571* (2013.01)

(58) Field of Classification Search
CPC ... B65D 5/6623; B65D 5/6682; B65D 5/6694
See application file for complete search history.

(56) References Cited

U.S. PATENT DOCUMENTS

| | | | |
|---|---|---|---|
| 6,496,503 B1 | 12/2002 | Pelissier | |
| 6,882,269 B2 | 4/2005 | Moreno | |
| 10,039,401 B1 * | 8/2018 | Romanucci .......... | A47G 29/141 |
| 10,383,471 B1 * | 8/2019 | Barnes ................ | A47G 29/124 |
| 10,769,875 B2 | 9/2020 | Arellano et al. | |
| 2002/0035515 A1 | 3/2002 | Moreno | |
| 2004/0158351 A1 | 8/2004 | Rivalto | |
| 2013/0138656 A1 | 5/2013 | Wheaton | |
| 2015/0106296 A1 | 4/2015 | Robinson | |
| 2015/0235493 A1 * | 8/2015 | Hall ......................... | G07C 9/28 |
| | | | 340/5.71 |

(Continued)

OTHER PUBLICATIONS

"Barska 0.63 cu. ft. Steel Safe Digital Portable Keypad Lock Box, Black", Nov. 16, 2016, Home Depot, Wayback Machine, https://web.archive.org/web/20161116130708/http://www.homedepot.com:80/p/BARSKA-0-63-cu-ft-Steel-Safe-Digital-Portable-Keypad-Lock-Box-Black-AX11910/205607116, (Year: 2016).*

(Continued)

*Primary Examiner* — Christopher Gomez
(74) *Attorney, Agent, or Firm* — NK Patent Law

(57) ABSTRACT

A repository is disclosed and configured for positioning on a porch of a building. The repository includes a mounting mechanism configured to secure the repository to at least one of a surface of the porch and a wall of the building. The repository further includes an interior compartment configured to store one or more packages.

14 Claims, 4 Drawing Sheets

(56)                    References Cited

U.S. PATENT DOCUMENTS

| | | | | |
|---|---|---|---|---|
| 2017/0364860 | A1 | 12/2017 | Wilkinson | |
| 2018/0107978 | A1 | 4/2018 | Drey | |
| 2018/0365641 | A1 | 12/2018 | Zhu | |
| 2019/0000255 | A1* | 1/2019 | Dehner | B65D 43/26 |
| 2019/0149399 | A1 | 5/2019 | Reed | |
| 2019/0362577 | A1* | 11/2019 | Vigil | G07C 9/27 |
| 2020/0065715 | A1 | 2/2020 | Fu | |
| 2020/0138225 | A1* | 5/2020 | Martin | B65D 55/02 |
| 2021/0000276 | A1 | 1/2021 | Dehner | |
| 2021/0082220 | A1* | 3/2021 | Boerger | G07C 9/10 |
| 2021/0406818 | A1* | 12/2021 | Adler | G06Q 10/08 |
| 2022/0061573 | A1* | 3/2022 | Jertberg | A47G 29/20 |

OTHER PUBLICATIONS

USPTO; Final Office Action for U.S. Appl. No. 16/703,994, dated Jul. 21, 2021, 21 pages.
USPTO; Non-final Office Action for U.S. Appl. No. 16/703,994, dated May 7, 2021, 20 pages.
USPTO; Non-final Office Action for U.S. Appl. No. 17/388,722, dated Nov. 16, 2022, 7 pages.
USPTO; Final Office Action for U.S. Appl. No. 17/388,722, dated May 17, 2023, 14 pages.
USPTO; Non-final Office Action for U.S. Appl. No. 17/388,722, dated Nov. 29, 2023, 15 pages.
USPTO; Final Office Action for U.S. Appl. No. 17/388,722, dated May 2, 2024, 13 pages.

* cited by examiner

REPOSITORY FOR SECURE PACKAGE DROP-OFF AND PICK-UP

CROSS-REFERENCE TO RELATED APPLICATIONS

This application is a continuation of U.S. patent application Ser. No. 17/388,722 filed Jul. 29, 2021, entitled "REPOSITORY FOR SECURE PACKAGE DROP-OFF AND PICK-UP", and being issued as U.S. Pat. No. 12,118, 504 on Oct. 15, 2024, which is a continuation of U.S. patent application Ser. No. 16/703,994 filed Dec. 5, 2019, entitled "SYSTEM FOR SECURE PACKAGE DROP-OFF AND PICK-UP", which claims priority to U.S. Provisional Patent Application Ser. No. 62/781,931 filed Dec. 19, 2018, entitled "SYSTEM FOR SECURE PACKAGE DROP-OFF AND PICK-UP". The disclosure of each of the aforementioned applications is incorporated herein by reference in their entireties.

TECHNICAL FIELD

The invention relates to a server for securely storing an article in a repository after drop-off of the article and before pick-up of the article until removed by a responsible party.

BACKGROUND

Package delivery, parcel delivery, mail delivery or even grocery delivery to a residential home or to business location is provided by postal systems (e.g., USPS) and private delivery services (e.g., UPS, FedEx, DHL, Amazon, etc.). When delivering a package or article to a residential neighborhood or to a generic building, the package may often be left on the front porch or near the front entrance to the building. There have been increased occurrences of package tampering and package theft with regard to such packages. Further, in a residential home setting, providing access to delivery personnel into the house for package delivery/pick-up when occupant is not present is eschewed by most home occupants. Alternately, if a package cannot be delivered to a destination that requires a signature by the recipient of the package as in, for example, a home where none of the occupants are home at the time of delivery, the package must be couriered to a retention facility for later pick-up by the intended party or another delivery attempt must be scheduled.

Thus, a need exists for a practical and efficient way of delivering packages or parcels that satisfactorily addresses these issues.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one aspect of the invention, a server for facilitating secure delivery and pickup of packages comprises a memory, a database, and a processor. The processor is configured to receive identification information associated with a package to be delivered or picked up, wherein the identification information is generated by a parcel shipper for tracking location and shipping progress of the package. The processor is also configured to generate an access code based on the identification information, and provide the access code to a first party for opening an access on a repository configured for holding the package. A code is input at a keypad coupled to the repository. The input code and the generated access code are compared. Access to an internal compartment of the repository through an access door on the repository is based on the comparison.

According to one or more embodiments, the processor is further configured to generate a further access code and provide the further access code to a second party associated with a package delivery, wherein the first party is associated with a package pick-up.

According to one or more embodiments, the processor is further configured to communicate with a web-portal configured to manage logistics associated with one or more of a package delivery and a package pick-up.

According to one or more embodiments, the processor is further configured to use an automated harvesting program to scour an email account associated with one or more of the package delivery and the package pick-up to extract the identification information associated with the package.

According to one or more embodiments, the repository is positioned at a first location, the repository including a first Media Access Control (MAC) address associated with a first network adaptor coupled to the repository.

According to one or more embodiments, the first MAC address is transferrable to a second network adaptor coupled to a further repository at a second location, wherein the first network adaptor coupled to the repository at the first location is assigned a second MAC address different from the first MAC address.

According to one or more embodiments, the unlock code is valid for a predetermined time span associated with a delivery time or a pick up time scheduled for the package, wherein the access code is inoperable to provide access through the access door outside of the predetermined time span.

According to one or more embodiments, the processor is further configured to generate an alert when the repository is tampered with.

According to one or more embodiments, the processor is further configured to generate a notification when the package is delivered or picked up.

According to one or more embodiments, the processor is further configured to generate an alert when the repository door remains unlocked beyond a predetermined duration subsequent to deposition of the package into the repository.

According to one or more embodiments, the repository includes a temperature sensor for sensing a temperature of the internal compartment of the repository, wherein the processor is further configured to receive a temperature notification from the temperature sensor.

According to one or more embodiments, the repository includes a camera positioned inside the internal compartment of the repository, wherein the processor is further configured to receive a picture taken by the camera of the package positioned inside the internal compartment of the repository.

According to one or more embodiments, the repository includes a scanner or imaging device for reading the identification information, wherein the access door on the repository is opened after the identification information is captured by the scanner or imaging device.

According to one or more embodiments, the access code includes at least a last four digits of a package tracking number associated with the package.

According to one or more embodiments, the access code includes at least a last eight digits of a package tracking number associated with the package.

According to one or more embodiments, the processor is further configured to process a package return by: facilitating capture of the identification information via an application operating on a mobile computing device; and, scheduling pick up of the package by a route carrier.

According to one or more embodiments, the repository includes a Wi-Fi hub.

According to one or more embodiments, the repository generates an audible alarm when the repository is tampered with.

According to one or more embodiments, the processor is further configured to generate an alert to an individual associated with the repository when the repository is tampered with.

According to one or more embodiments, the access code is configured for single use.

According to one or more embodiments, the access code is configured for multiple uses.

According to one or more embodiments, the access code further includes alphanumeric characters customized for a characteristic associated with the first party.

According to one or more embodiments, the processor is further configured to receive a picture of a person approaching the repository from a camera coupled to the repository.

According to one or more embodiments, the processor is further configured to communicate with an application operating on a mobile communication device via a graphical user interface (GUI) of the mobile communication device.

According to one or more embodiments, the repository includes a key access operable to open the access door on the repository.

According to one or more embodiments, the processor is further configured to communicate with the repository via one or more of a USB port, a Wi-Fi connection, an Ethernet connection, a Bluetooth connection, a cellphone network tower connection and a satellite connection.

According to one or more embodiments, the processor is further configured to communicate with a communication transceiver coupled to the repository.

According to one or more embodiments, the processor is further configured to communicate with a communication transceiver coupled to the repository via a wireless connection.

According to one or more embodiments, the processor is further configured to communicate with a communication transceiver coupled to the repository via a wired connection.

According to one or more embodiments, the processor is further configured to determine a location data associated with the package from the identification information, wherein the processor uses the location data for verifying delivery or pick up of the package.

According to one or more embodiments, the processor is further configured to generate a further access code that does not include a portion of the identification information.

Other objects and advantages of this invention will be better appreciated from the following detailed description.

DESCRIPTION OF EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Embodiments of the presently disclosed subject matter relate to providing digitally controlled access to a package repository and, more particularly, to a system and a server configured for managing access to an internal compartment of the repository, the access associated with for package pick up or package delivery. One or more embodiments as disclosed herein advantageously allow for secure delivery systems configured for coordinating secure delivery and pick up of packages at a secure repository in communication with the system as disclosed herein, with goods within the repository capable of being retrieved by an user, at his or her convenience. According to advantageous aspects of the disclosed subject matter, the server generates an access code based on identification information generated by a parcel shipper for tracking location and shipping progress of a package to be delivered or picked up. According to at least one embodiment, the access code generated by the server includes at least the last 4 digits of a package tracking number associated with the package. According to another embodiment, the access code generated by the server can include up to the last eight digits of a package tracking number associated with the package. According to another aspect of the invention, the access code generated by the server includes at least the last eight digits of a package tracking number associated with the package.

Figure 1:
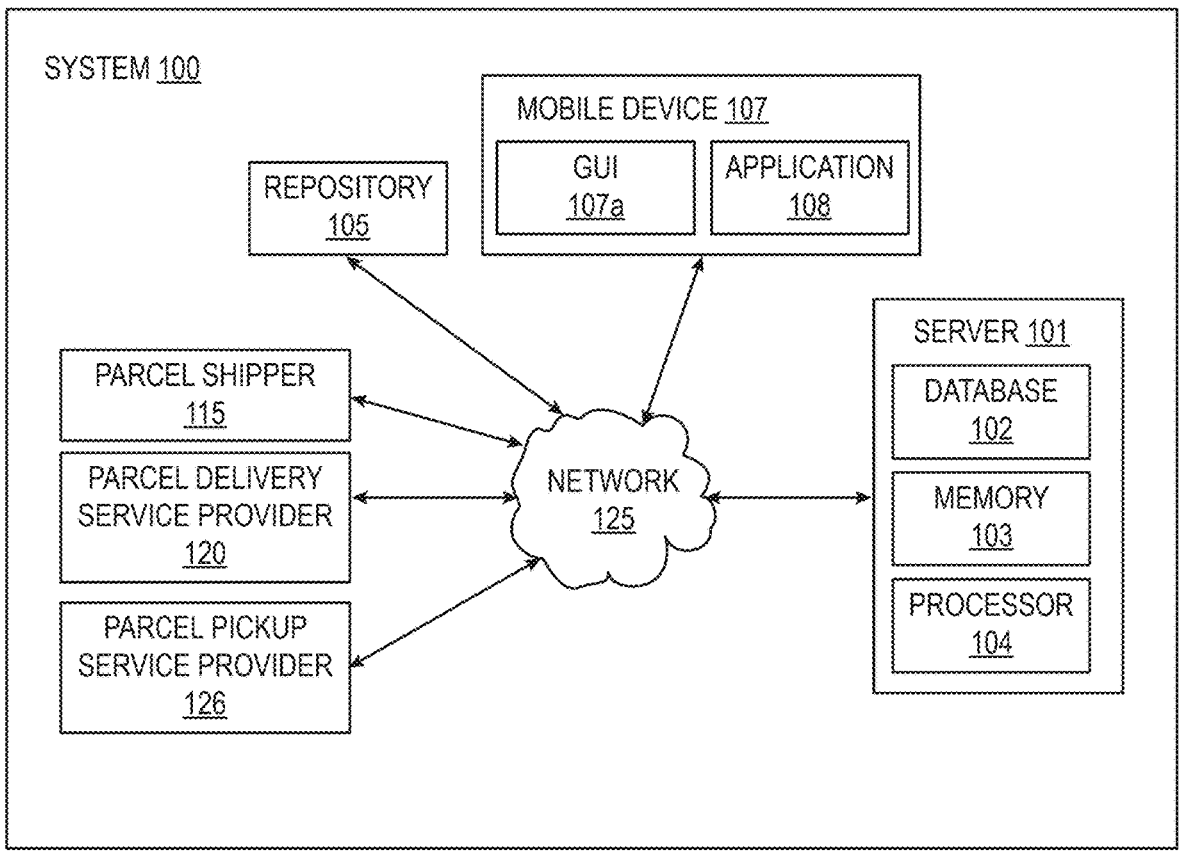
FIG. 1 is a block diagram of a system for secure delivery and pickup of packages, in accordance with an embodiment of the present invention.

One embodiment of a system for facilitating secure delivery or secure pick up of a package is shown in FIG. 1. As shown, system 100 includes at least one repository 105 having an interior compartment in which one or more packages are stored. The repository 105 is connected to a server such as server 101. Server 101 controls the operation of and access to one or more repositories 105 whereby server 101 facilitates secure delivery and pickup of packages to and from the one or more repositories 105.

Server 101 communicates over network 125 with repository 105, one or more mobile devices 107 with GUI 107*a*, parcel shipping service provider 115, package delivery service provider 120, and package pickup service provider 126. The term "package" as used herein refers to any article that can be dropped off in repository 105 or picked up from the repository 105, the package including articles such as, for example, a processed food item, a farm produce, a parcel, an envelope, or any other item that may be delivered to, or picked up from, a customer location.

Figure 2:
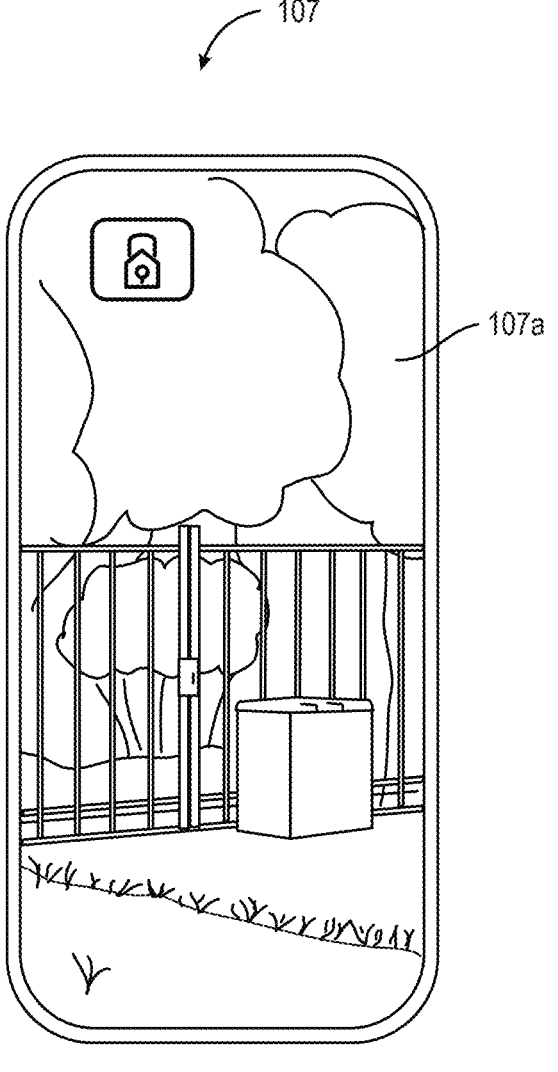
FIG. 2 is a front view of a mobile device in communication with the system for secure delivery and pickup of packages, in accordance with an embodiment of the present invention.

Server 101 may communicate with one or more mobile devices 107, each mobile device 107 including a graphical user interface (GUI) 107a and an application 108. A user of mobile device 107 may be able to interact with application 108 via GUI 107a for communicating with server 101, and optionally with repository 105. Server 101 may communicate wirelessly with application 108 operating on a mobile device 107. Similarly, server 101 may communicate wirelessly with repository 105. In one embodiment, the GUI 107a associated with application 108 may display a web page associated with system 100 as illustrated in FIG. 2.

Server 101 includes database 102, memory 103 and processor 104. Processor 104 is configured to receive identification information associated with a package to be delivered or picked up. The identification information is generated by a parcel shipping service provider 115 for tracking location and shipping progress of the package. As is well known in the relevant art, parcel shippers typically generate identification information that helps facilitate identification of a package including its weight, size, point of origin, point of destination, package tracking number and similar other information. The identification information can include alphanumeric characters and other machine readable codes. Processor 104 of server 101 is configured to generate an access code based on the received identification information. The identification information may be received wirelessly by server 101 from a portal operated by the parcel shipping service provider 115.

Processor 104 provides the generated access code to an authorized first party for opening an access on repository 105. In one embodiment, the authorized first party may be a homeowner or home occupant who needs to pick up a package recently dropped within the interior compartment of repository 105. In one embodiment, the authorized first party may be a delivery person who needs to drop a package within the interior compartment of repository 105. In one embodiment, the authorized first party may be a pick-up person who needs to pick up a package present within the interior compartment of repository 105.

In various embodiments, repository 105 includes a keypad 401 coupled to a locking mechanism 403 that secures the access on repository 105. The access code may be entered on the keypad 401. If the entered access code is deemed to be correct or acceptable, the locking mechanism 403 unlocks thereby providing access to an interior compartment of repository 105. In one embodiment, the verification of the access code may be performed by server 101. In one embodiment, the verification of the access code may be performed by a processer forming part of, or otherwise coupled to, repository 105.

In some embodiments, the access code may be electronically communicated by server 101 to the repository through a wired connection such as through a USB port, or through a wireless connection such us, for example, a Wi-Fi connection or a Bluetooth connection. In one embodiment, the access code includes at least the last four digits of a package tracking number associated with the package. In another embodiment, the access code includes at least the last eight digits of a package tracking number associated with the package. In another embodiment, the access code includes the middle four or more digits of the package tracking number associated with the package. In a further embodiment, the access code includes alphanumeric characters customized for a characteristic associated with the first party. This way, the input access code may include some identifying information regarding the person inputting the access code into the keypad of repository 105. As an illustrative example, a FedEx worker may be supplied with an access code that includes the characters "FEDEX" as the first five alphanumeric characters of the access code.

In various embodiments, server 101 is configured to maintain a history of all codes entered at the keypad with time stamps including those associated with unsuccessful attempts. In some embodiments, different sets of access codes may be generated by server 101, with one set of access codes configured for a single access to the interior compartment of repository 105 and another set of access codes configured for permitting multiple accesses to the interior compartment of repository 105.

Figure 3:
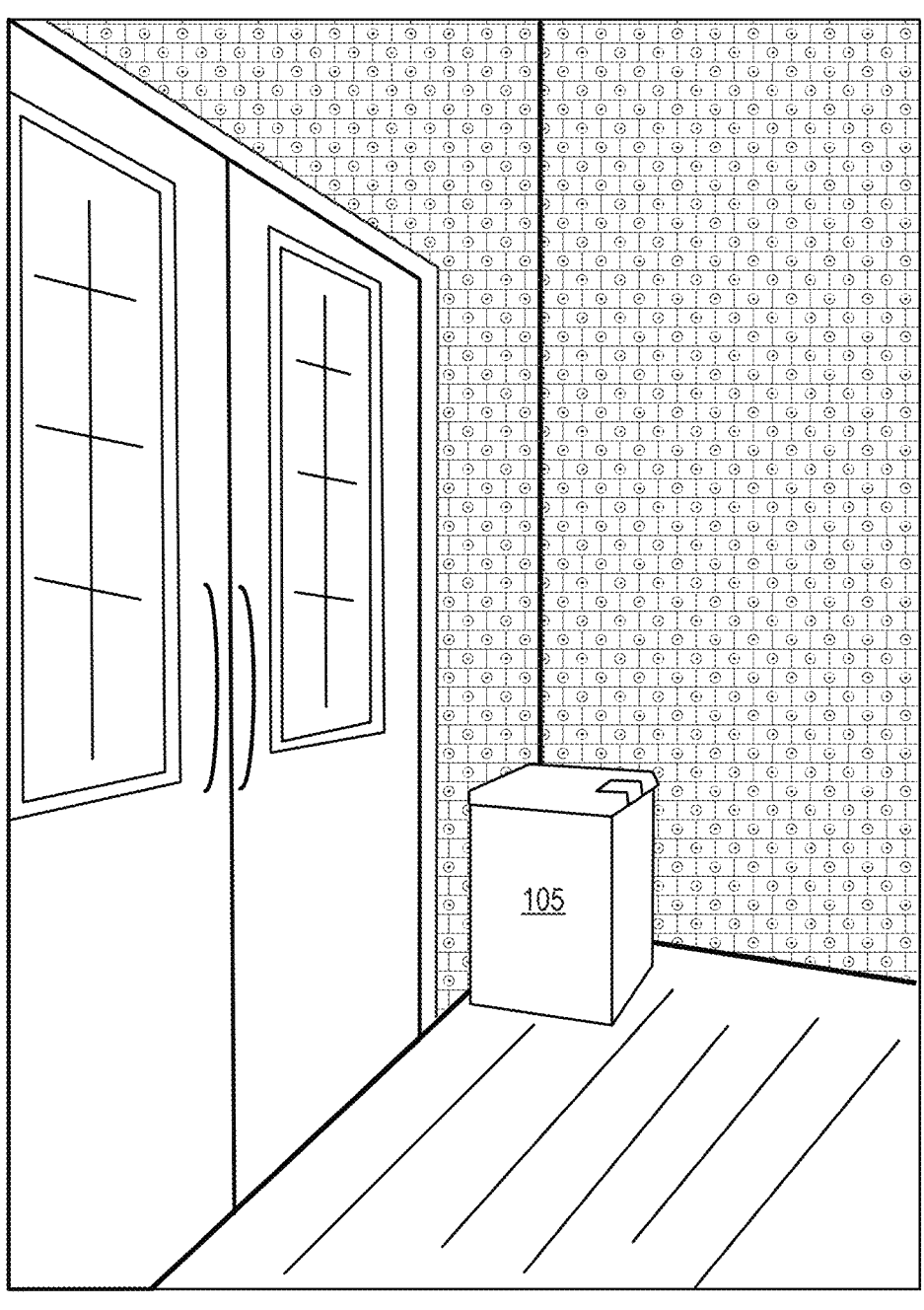
FIG. 3 is a perspective view of a repository in communication with the system for secure delivery and pickup of packages positioned on the front porch of a building, in accordance with an embodiment of the present invention.
Figure 4:
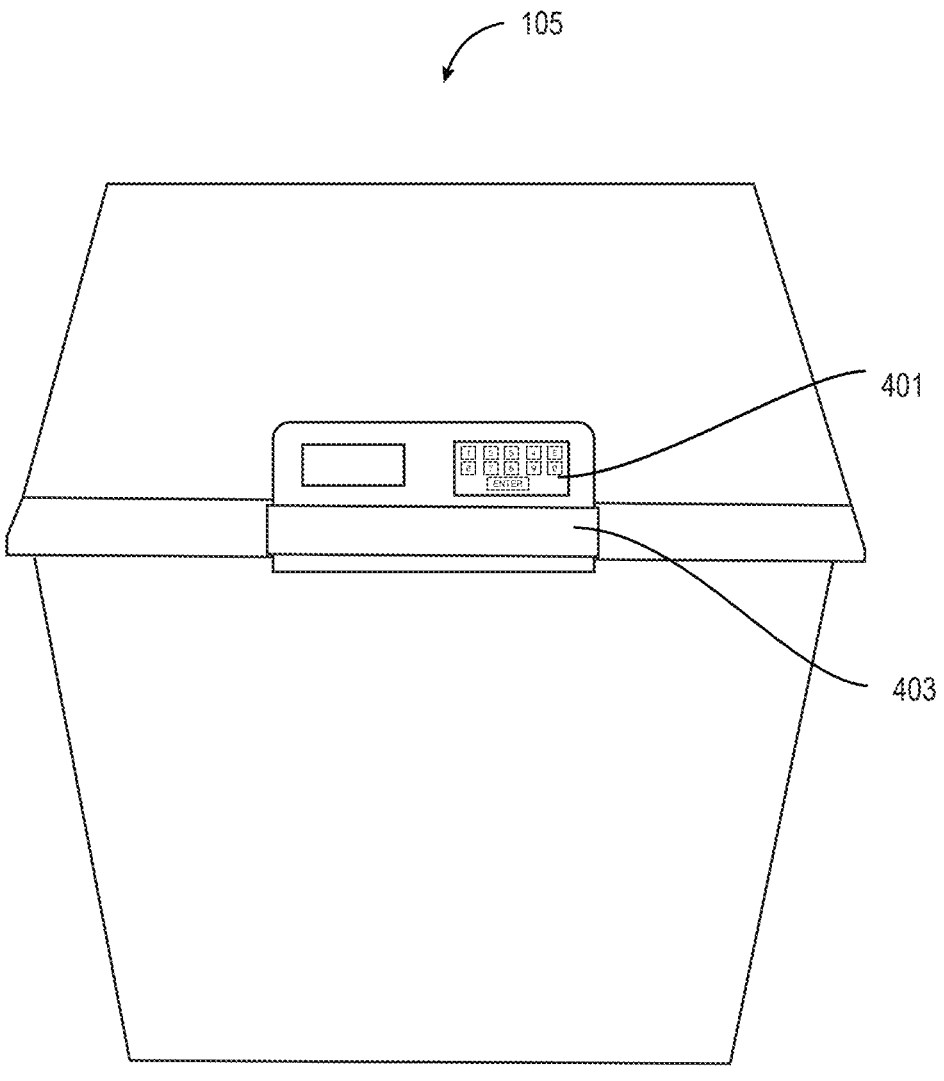
FIG. 4 is a perspective view of the repository of FIG. 3, in accordance with an embodiment of the present invention.

In various embodiments, repository 105 includes at least one sidewall having a top rim and a bottom side, as illustrated in FIGS. 3 and 4 below. For example, the repository 105 may include four sidewalls. The sidewalls and the bottom side form an interior storage compartment of repository 105 in between with an upper ceiling covering an access (i.e., an opening) defined by the top rims of the sidewalls. The access may be secured by a door provided with a door handle and/or a door lock. The door may close to cover the access to the interior compartment of repository 105 and open to reveal the inside of the interior compartment of repository 105. Repository 105 may further include provisions for accepting electrical, data and internet connections to the repository.

In certain embodiments, repository 105 includes a mounting mechanism for mounting the bottom side of the repository 105 to a flat horizontal surface. In certain embodiments, the surface may be a porch or landing in front of a residential home or a building. The mounting mechanism may include bolts going through openings in the bottom side of the repository 105, whereby the locking bolt may secure the repository 105 to the surface. In the same embodiments or in other embodiments, repository 105 can include a mounting mechanism for mounting to a wall or a vertical structure.

Repository 105 may be produced by injection molding. Other construction technics and materials are also envisioned. In certain embodiments, the dimensions of the repository may be about 18 inches in width, at least 24 inches in depth, and 24 inches in length. However, repository 105 is not limited to the dimensions mentioned above and may be any dimensions desired. In other words, repository 105 may have a suitable size depending on the application and/or the requirements of an individual or business as it relates to factors such as quantity, delivery or pick-up frequency, size, volume, and quality of the packages for delivery and/or pick-up.

According to advantageous features of the presently disclosed subject matter, during operations, a user inputs a code at the keypad coupled to the repository. The input code is compared by server 101 (or alternately by a repository processor coupled to repository 105) with the access code generated by the server 101. Subsequent to the comparison, the server 101 (or the repository processor) makes a determination that the input code is adequate and proceeds to initiate the opening of an access door on the repository in order to provide access to the internal compartment of repository 105. In one embodiment, an exact match between the input code and the generated access may be required. In another embodiment, a partial match may be adequate, the partial match representing a substantial match. In one embodiment, a memory coupled to repository 105 may receive and store the access code, whereby when the code is being input, there is no need for a real-time verification with server 101; instead, a processor coupled to repository 105 (i.e., the repository processor) may be able to perform the comparison of the input code with the access code generated by the server 101. Subsequent to the comparison, the repository processor may make a determination that the input code is adequate and proceed to initiate the opening of an access door on repository 105 in order to provide access to the internal compartment of repository 105.

In some embodiments, processor 104 of server 101 is further configured to generate a further access code and provide the further access code to a second party associated with a package delivery, wherein the first party is associated with a package pick-up. In this embodiment, the first party may represent an individual authorized to pick up a package present within repository 105; in one example, the first party represents the owner of repository 105. In the same embodiment or in a different embodiment, the second party may represent an individual authorized to deliver a package; in one example, the second party may be an employee of a parcel shipping service provider 115 such as UPS, FedEx, USPS, and similar other parcel shipping service providers.

In some embodiments, server 101 is further configured to communicate with a web-portal configured to manage logistics associated with one or more of a package delivery and a package pick-up. The web-portal may represent a logistics management system that coordinates transportation, tracking and delivery of packages, as well as the pick-up, tracking and transportation of packages being returned, for example. In some further embodiments, server 101 is further configured to use an automated harvesting program to scour an email account associated with one or more of the package delivery and the package pick-up to extract the identification information associated with the package. In one example, application 108 executing on mobile device 107 associated with the first user or the second user is configured to crawl or scour the email accounts present on mobile device 107, after appropriate permissions are provided by the first and second users for such activity. The effect of such crawling or scouring may be the harvesting of information related to the identification information generated by a parcel shipper, such as parcel shipping service provider 115, associated with the tracking location and shipping progress of a package. In various embodiments, application 108 executing on mobile device 107 is communication with a parent application operating on server 101.

In some embodiments, the first Media Access Control (MAC) address associated with a first network adaptor coupled to a first repository 105 may be transferrable to a different repository 105. This may advantageously allow an individual to maintain the same MAC address even after the individual relocates to a new second location. After the relocation, the first MAC address may be then linked to a new second repository 105 located at the second location. This may be accomplished by transferring a first MAC address associated with a first network adaptor coupled to the first repository located a first location of the individual to a second network adaptor coupled to a second repository located at a second location associated with the individual's relocation. In this example, the first network adaptor coupled to the first repository at the first location may then be assigned a second MAC address different from the first MAC address.

In some embodiments, the access code generated by server 101 may be valid only for a predetermined time span associated with a delivery time or a pick up time scheduled for the package; in these embodiment, the access code is rendered inoperable in providing access through the access door outside of the predetermined time span.

The system 100 may further include several alert systems. In one embodiment, the server 101 of system 100 may generate an alert when repository 105 is tampered with. For example, the tampering may be associated with an attempt to steal a package present in the internal compartment of repository 105. In another embodiment, or in the same embodiment, server 101 is further configured to generate an alert when the repository door remains unlocked beyond a predetermined duration subsequent to deposition of a package into the repository. In a further embodiment, server 101 is further configured to generate a notification when the package is delivered or picked up. In one embodiment, the repository 105 is configured to generate an audible alarm when the repository is tampered with. In the same embodiment or in a different embodiment, server 101 and/or repository 105 is further configured to generate an alert on mobile device 107 of an individual associated with the repository when repository 105 is tampered with application 108 operating to generate the alert on mobile device 107.

In various embodiments, repository 105 can include a temperature sensor for sensing a temperature of the internal compartment of repository 105. In such an embodiment, server 101 may receive a temperature notification from the temperature sensor, for example, when the temperature is outside of a safe temperature range prescribed for the package present in the internal compartment of repository 105. The repository 105 and/or server 101 may generate a notification on mobile device 107 regarding this temperature anomaly.

In one embodiment, repository 105 includes a camera positioned inside the internal compartment of the repository; in other embodiments, the camera may be positioned on an outer surface of the repository. In this embodiment, server 101 may receive a picture taken by the camera of the package positioned inside the internal compartment of repository 105. Server 101 may utilize the picture taken by the camera to compare against a pre-existing picture of a package scheduled for delivery around the time when the picture was taken by the camera. Server 101 may further forward the taken picture to mobile device 107 for viewing by the first and/or second user.

In one embodiment, repository 105 includes a scanner or imaging device for reading the identification information. Server 101 may review the identification information read by the scanner or image device. After determining the identification information to be associated with a package scheduled for delivery around the time when the identification information was read, the server may cause the access door on the repository 105 to open so that the package could be placed within the internal compartment of repository 105. In an alternate embodiment, the repository processor coupled to repository 105 may make this determination based on a comparison of the scanned information and identification information received earlier from server 101, wherein the earlier received identification information may be stored in a memory coupled to repository 105 and accessible by the repository processor. Based on a comparison of the two, repository processor may proceed to open access to the internal compartment of repository 105.

In some embodiments, server 101 may be further configured to process a package return. To process a package pattern, server 101 may facilitate capture of the identification information on the package via an application 108 operating on mobile device 107. Server 101 may utilize the captured identification information to schedule pick up of the package by a route carrier.

In another embodiment, repository 105 includes a camera positioned on an external surface of repository 105. In this embodiment, server 101 may receive a picture taken by the camera of a person approaching the repository 105 from the camera. Server 101 may save these pictures in memory 103. In some embodiments, repository 105 may include a key access operable to open the access door on the repository.

In one embodiment, repository 105 includes a Wi-Fi hub. In various embodiments, server 101 may communicate with a transceiver coupled to repository 105 over any variety of wired and wireless networks, and utilize security and authentication procedures to permitting access to the interior storage compartment of the repository 105. In various embodiments, server 101 may communicate with repository 105 via one or more of a USB port, Wi-Fi (e.g., 802.11 wireless), Bluetooth, RFID, NFC, cellphone network tower connection, satellite connection, and similar other communication systems. In one embodiment, server 101 communicates with a communication transceiver coupled to repository 105 via a wired connection. In another embodiment, server 101 is configured to communicate with a communication transceiver coupled to repository 105 via a wireless connection. In the same or different embodiment, server 101 is configured to communicate with a communication transceiver coupled to repository 105 via a wired connection.

In various embodiments, server 101 is configured to determine a location data associated with the package from the identification information; server 101 uses this location data for verifying delivery or pick up of a package. In some embodiments, server 101 is further configured to generate a further (i.e., an additional) access code that does not include a portion of the identification information.

According to various embodiments, a method of facilitating secure delivery and pickup of packages includes receiving, at a server, identification information associated with a package to be delivered or picked up, wherein the identification information is generated by a parcel shipper for tracking location and shipping progress of the package. The method further includes generating, at the server, an access code based on the identification information. The method also includes providing, by the server, of the access code to a first party for opening an access on a repository configured for holding the package. A code is input at a keypad coupled to the repository, the input code and the generated access code are compared, and access to an internal compartment of the repository through an access door on the repository is based on the comparison.

As will be appreciated by one skilled in the art, aspects of the present invention may be embodied as a system, method or computer program product. Accordingly, aspects of the present invention may take the form of an entirely hardware embodiment. Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A parcel repository configured to be positioned on a porch of a building and deter theft during package pickup and delivery, the parcel repository comprising:

four side walls and a bottom side configured to define an interior compartment of the parcel repository, wherein the interior compartment is configured to store a package;

a repository door positioned on a top side of the parcel repository, wherein the repository door is configured to an overhang and secure a horizontal access defined by top rims of the four side walls;

a processor;

a key access operable to open the repository door;

a keypad positioned at least partially on a front portion of the overhang and partially on a horizontal portion on the repository door, wherein the keypad is configured for receiving an input code;

a temperature sensor;

a locking mechanism positioned at least partially on the front portion of the overhang and opposite to a hinged portion on the repository door and externally coupled with the keypad, wherein the locking mechanism secures the horizontal access to the parcel repository; and a wireless communications mechanism, wherein the processor is configured for:

comparing the input code to a generated access code for opening the repository door; and generating a plurality of alerts via the wireless communication mechanism to a mobile device, wherein the plurality of alerts includes:

a first alert when the locking mechanism remains unlocked beyond a predetermined duration, wherein the predetermined duration begins subsequent to deposition of the package into the parcel repository; and a second alert when a temperature anomaly is detected.

2. The parcel repository of claim 1, wherein the generated access code is valid only for a predetermined time span.

3. The parcel repository of claim 2, wherein the predetermined time span is associated with at least one of a delivery time and a pick up time scheduled for the package.

4. The parcel repository of claim 1, wherein the generated access code includes at least four digits of a package tracking number associated with the package.

5. The parcel repository of claim 1, wherein the generated access code includes at least eight digits of a package tracking number associated with the package.

6. The parcel repository of claim 1, wherein the generated access code is received via the wireless communications mechanism from a remote computing device and the remote computing device is configured to transmit the generated access code to the mobile device.

7. The parcel repository of claim 1, wherein the generated access code is configured for a single use.

8. The parcel repository of claim 1, wherein the generated access code is configured for multiple uses.

9. The parcel repository of claim 1, wherein the parcel repository is configured to generate a tamper notification for the mobile device upon detecting a tampering event.

10. The parcel repository of claim 9, wherein the mobile device is associated with a user authorized to place a package within the interior compartment.

11. The parcel repository of claim 9, wherein the mobile device is associated with a user authorized to remove a package from the interior compartment.

12. The parcel repository of claim 1, wherein:

the parcel repository is a residential parcel repository; and the building is a residential building.

13. The parcel repository of claim 12, wherein the residential building is a residential home.

14. The parcel repository of claim 1, wherein the generated access code includes alphanumeric characters customized for a characteristic associated with a first party.

* * * * *